Patented Aug. 14, 1934

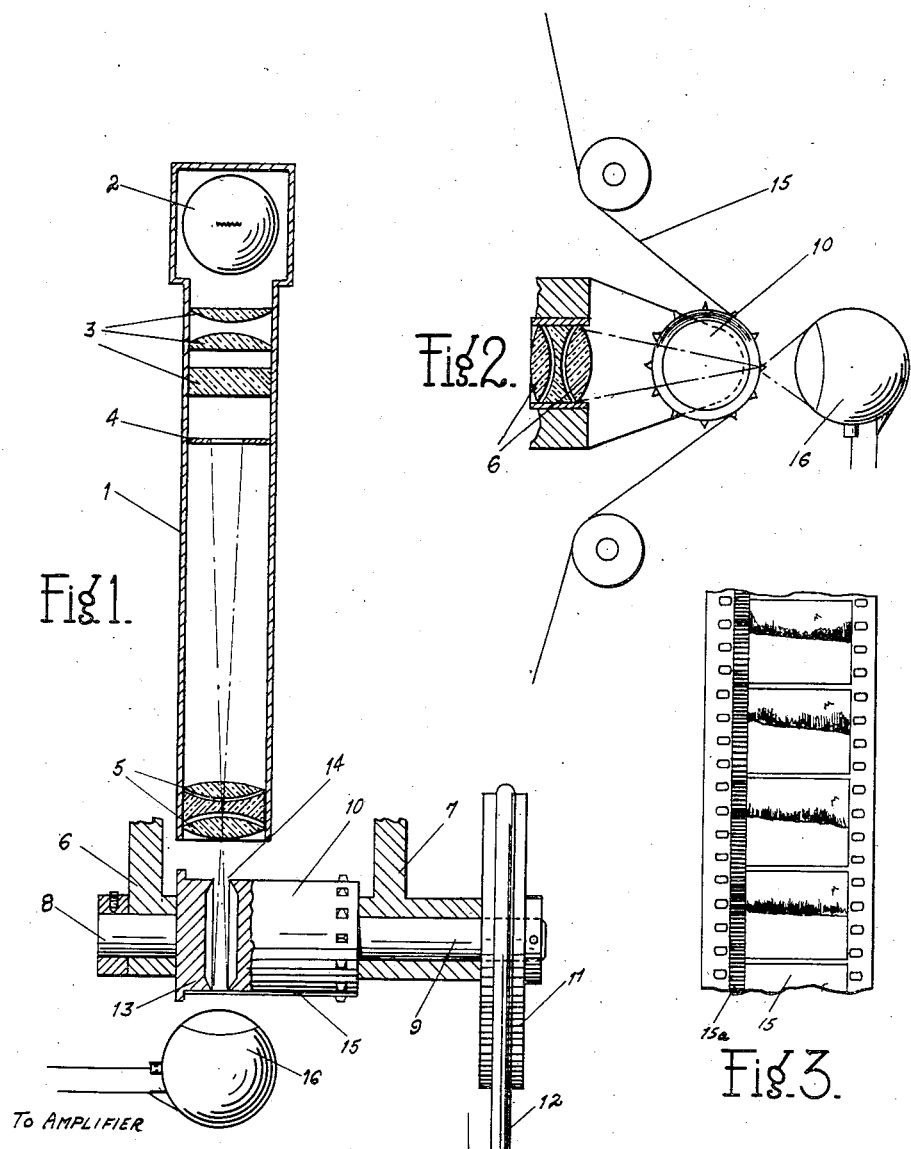

1,970,102

UNITED STATES PATENT OFFICE 1,970,102

SOUND RECORDING AND REPRODUCING APPARATUS

Freeman H. Owens, New York, N. Y.

Application June 10, 1929, Serial No. 369,890

3 Claims. (Cl. 179—100.3)

This invention relates to improvements in sound recording and reproducing apparatus, the principal object of the invention being to provide a two-part rotatable support for the film, the parts of the support being so disposed relatively to each other as to form between them a light-confining aperture through which light is focused on the film.

Other objects and advantages of the invention will appear as the description proceeds.

In the drawing accompanying this specification,

Figure 1 is a longitudinal sectional view through an optical system showing the improved film support partly in section;

Figure 2 is a view taken on a plane passing between the opposing ends of the film-supporting members; and Figure 3 is a fragmentary view of a film carrying a photographic sound-record.

The same characters of reference designate the same parts in the different figures of the drawing.

Referring to the drawing, 1 designates a tube or housing carrying the usual optical system comprising a lamp 2, condenser lens system 3, slit partition 4 and focusing lens 5. A pair of brackets 6 and 7 are provided, which may be supported on the tube 1 if desired or on any other convenient points of support, and mounted for rotation in said brackets and in axial alignment with each other are a pair of shafts 8 and 9 respectively. Secured to the shaft 9 at one end thereof is a sprocket 10, and at its opposite end is secured a pulley 11 over which passes a belt 12 for transmitting motion to the shaft from a suitable source of power. Secured to the shaft 8 is a flanged guide roller 13, the surface of which is in exact alignment with the surface of the sprocket 10, the opposing ends of the sprocket and roller being spaced apart as indicated at 14 to form a light-confining pathway for the passage of rays of light focused therethrough by the lens 5.

Supported on the sprocket and roller is a traveling film 15, having photographed thereon a sound record 15ª so disposed on the film that when the latter is in position on the roller and sprocket the sound record will be in exact alignment with the pathway 14. A light sensitive element, such as a photoelectric cell 16, is disposed in position to receive the modulated light rays after their passage through the sound record, the output of said cell being adapted for connection to an amplifier and loud speaker (not shown) in the usual manner.

While I have shown the device herein applied to a reproducing apparatus, it will be obvious that it is equally applicable to a recording device.

I claim:

1. In an apparatus of the character described, the combination of an optical system and a light slit, a sprocket and a flanged guide roller supported for rotation in axial alignment with each other, said sprocket and roller being spaced apart at their opposing ends to form a free and unobstructed light-confining pathway for rays of light from said optical system and slit, and a traveling sound record supported on said sprocket and roller in the path of light passing through said pathway, said light slit and said sound record being positioned on opposite sides of said spaced sprocket and roller.

2. In combination a film support comprising a pair of spaced rollers, one of said rollers having a flange on its outer end, the adjacent ends of said rollers defining a free and unobstructed light passage to a film supported on one side of said rollers, said rollers being in axial alignment and one of said rollers having film engaging sprocket teeth, and a light source in alignment therewith and on the opposite side of said rollers.

3. In combination a film support comprising a pair of spaced rollers, the adjacent ends of which define a light passage to a film supported on one side thereof, one of said rollers having film engaging sprocket teeth, and a light source in alignment therewith on the opposite side of said rollers.

FREEMAN H. OWENS.